US007197586B2

(12) United States Patent
DeWitt, Jr. et al.

(10) Patent No.: US 7,197,586 B2
(45) Date of Patent: Mar. 27, 2007

(54) METHOD AND SYSTEM FOR RECORDING EVENTS OF AN INTERRUPT USING PRE-INTERRUPT HANDLER AND POST-INTERRUPT HANDLER

(75) Inventors: Jimmie Earl DeWitt, Jr., Georgetown, TX (US); Frank Eliot Levine, Austin, TX (US); Christopher Michael Richardson, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 10/757,192

(22) Filed: Jan. 14, 2004

(65) Prior Publication Data

US 2005/0154812 A1 Jul. 14, 2005

(51) Int. Cl.
*G06F 13/24* (2006.01)
(52) U.S. Cl. ............... 710/260; 710/261; 710/263; 710/269
(58) Field of Classification Search ........ 710/260–269; 712/200, 244
See application file for complete search history.

(56) References Cited

U.S. PATENT DOCUMENTS

| 4,291,371 | A |   | 9/1981  | Holtey ................. 364/200 |
|-----------|---|---|---------|--------------------------------|
| 4,825,359 | A | * | 4/1989  | Ohkami et al. ............ 712/15 |
| 5,103,394 | A |   | 4/1992  | Blasciak ................ 395/575 |
| 5,463,775 | A | * | 10/1995 | DeWitt et al. ............ 702/186 |
| 5,628,018 | A | * | 5/1997  | Matsuzaki et al. .......... 710/260 |
| 5,652,858 | A |   | 7/1997  | Okada et al. |
| 5,691,920 | A |   | 11/1997 | Levine et al. .......... 364/551.01 |
| 5,710,881 | A |   | 1/1998  | Gupta et al. |

(Continued)

FOREIGN PATENT DOCUMENTS

| JP | 2000029731  | 12/1999 |
|----|-------------|---------|
| JP | 2000347863  | 12/2000 |

OTHER PUBLICATIONS

Kikuchi, "Parallelization Assist System", Joho Shori, vol. 34, No. 9, Sep. 1993, pp. 1158-1169.

(Continued)

*Primary Examiner*—Mark H. Rinehart
*Assistant Examiner*—Raymond N Phan
(74) *Attorney, Agent, or Firm*—Duke W. Yee; Herman Rodriguez; Gerald H. Glanzman

(57) ABSTRACT

A method, apparatus, and computer instructions for providing pre and post handlers to log trace records before entering or after exiting the interrupt handler. A trace record includes a 'from' address where the interrupt occurs or where the branch instruction is executed or a 'to' address for the branch to case and counts of selected performance monitoring events. A timestamp may be associated with each event. In one embodiment, the pre and post handler is used with trap on branch to log trace records prior to and immediate after taking a branch. In another embodiment, a pre handler is enabled to log trace records that occur prior to executing interrupt service routines. A post handler is enabled to log trace records that occur after the interrupt service routines is executed and prior to returning to normal execution. Resulting low-level performance trace data may be collected by the user at a later time for more structured performance analysis.

53 Claims, 4 Drawing Sheets

U.S. PATENT DOCUMENTS

| | | | |
|---|---|---|---|
| 5,745,770 A * | 4/1998 | Thangadurai et al. ....... | 710/260 |
| 5,761,103 A | 6/1998 | Oakland et al. | |
| 5,768,500 A | 6/1998 | Agrawal et al. | |
| 5,774,724 A | 6/1998 | Heisch ........................ | 395/704 |
| 5,822,763 A | 10/1998 | Baylor et al. | |
| 5,822,790 A | 10/1998 | Mehrotra | |
| 5,857,097 A * | 1/1999 | Henzinger et al. .......... | 712/236 |
| 5,928,334 A | 7/1999 | Mandyam et al. | |
| 5,930,508 A | 7/1999 | Faraboschi et al. ......... | 395/706 |
| 5,937,437 A | 8/1999 | Roth et al. ................... | 711/202 |
| 5,938,778 A | 8/1999 | John, Jr. et al. .............. | 714/45 |
| 5,940,618 A | 8/1999 | Blandy et al. | |
| 5,950,003 A | 9/1999 | Kaneshiro et al. | |
| 5,966,537 A | 10/1999 | Ravichandran ............. | 395/709 |
| 5,966,538 A | 10/1999 | Granston et al. | |
| 5,987,250 A | 11/1999 | Subrahmanyam ........... | 395/704 |
| 6,026,235 A | 2/2000 | Shaughnessy | |
| 6,070,009 A | 5/2000 | Dean et al. .................. | 395/704 |
| 6,094,709 A | 7/2000 | Baylor et al. | |
| 6,101,524 A | 8/2000 | Choi et al. ................... | 709/102 |
| 6,134,676 A | 10/2000 | VanHuben et al. ........... | 714/39 |
| 6,148,321 A * | 11/2000 | Hammond .................. | 718/100 |
| 6,149,318 A | 11/2000 | Chase et al. | |
| 6,185,671 B1 | 2/2001 | Pentovski et al. | |
| 6,189,141 B1 | 2/2001 | Benitez et al. .................. | 717/4 |
| 6,189,142 B1 | 2/2001 | Johnston et al. | |
| 6,192,513 B1 | 2/2001 | Subrahmanyam .............. | 717/5 |
| 6,206,584 B1 | 3/2001 | Hastings ................ | 395/183.11 |
| 6,223,338 B1 | 4/2001 | Smolders ........................ | 717/4 |
| 6,243,804 B1 | 6/2001 | Cheng ......................... | 712/228 |
| 6,247,113 B1 | 6/2001 | Jaggar | |
| 6,256,775 B1 | 7/2001 | Flynn ............................. | 717/4 |
| 6,275,893 B1 * | 8/2001 | Bonola ....................... | 710/262 |
| 6,285,974 B1 | 9/2001 | Mandyam et al. | |
| 6,286,132 B1 | 9/2001 | Tanaka et al. .................. | 717/4 |
| 6,324,689 B1 | 11/2001 | Lowney et al. ................. | 717/9 |
| 6,330,662 B1 | 12/2001 | Patel et al. .................. | 712/236 |
| 6,351,844 B1 | 2/2002 | Bala ............................... | 717/4 |
| 6,374,364 B1 | 4/2002 | McElroy et al. .............. | 714/10 |
| 6,381,679 B1 | 4/2002 | Matsubara et al. | |
| 6,408,386 B1 * | 6/2002 | Hammond et al. .......... | 712/244 |
| 6,430,741 B1 | 8/2002 | Mattson, Jr. et al. ....... | 717/154 |
| 6,442,585 B1 | 8/2002 | Dean et al. .................. | 709/108 |
| 6,446,029 B1 | 9/2002 | Davidson et al. ........... | 702/186 |
| 6,460,135 B1 | 10/2002 | Suganuma | |
| 6,480,938 B2 | 11/2002 | Vondran, Jr. ................. | 711/125 |
| 6,539,458 B2 | 3/2003 | Holmberg | |
| 6,594,820 B1 | 7/2003 | Ungar | |
| 6,636,950 B1 | 10/2003 | Mithal et al. | |
| 6,687,794 B2 | 2/2004 | Malik | |
| 6,721,875 B1 | 4/2004 | McCormick et al. | |
| 6,757,771 B2 * | 6/2004 | Christie ....................... | 710/260 |
| 6,775,728 B2 * | 8/2004 | Zimmer et al. ............. | 710/260 |
| 6,782,454 B1 | 8/2004 | Damron | |
| 6,820,155 B1 * | 11/2004 | Ito .............................. | 710/262 |
| 6,842,850 B2 | 1/2005 | Ganapathy et al. | |
| 6,848,029 B2 | 1/2005 | Coldewey | |
| 6,944,720 B2 | 9/2005 | Sperber et al. | |
| 6,973,417 B1 | 12/2005 | Maxwell et al. | |
| 6,973,542 B1 | 12/2005 | Schmuck et al. | |
| 7,035,996 B2 | 4/2006 | Woodall et al. | |
| 2001/0032305 A1 | 10/2001 | Barry .......................... | 712/34 |
| 2002/0019976 A1 | 2/2002 | Patel et al. .................. | 717/137 |
| 2002/0073406 A1 | 6/2002 | Gove | |
| 2002/0124237 A1 | 9/2002 | Sprunt et al. ............... | 717/127 |
| 2002/0129309 A1 | 9/2002 | Floyd et al. ................. | 714/724 |
| 2002/0147965 A1 | 10/2002 | Swaine et al. .............. | 717/124 |
| 2002/0199179 A1 | 12/2002 | Lavery et al. .............. | 717/158 |
| 2003/0066055 A1 | 4/2003 | Spivey | |
| 2003/0126590 A1 | 7/2003 | Burrows et al. | |
| 2003/0131343 A1 | 7/2003 | French et al. | |
| 2004/0030870 A1 | 2/2004 | Buser | |
| 2004/0205302 A1 | 10/2004 | Cantrill | |
| 2004/0268316 A1 | 12/2004 | Fisher et al. | |

OTHER PUBLICATIONS

Cohen et al., "Hardware-Assisted Characterization of NAS Benchmarks", Cluster Computing, V I. 4, No. 3, Jul. 2001, pp. 189-196.
Talla et al., "Evaluating Signal Processing and Multimedia Applications on SIMD, VLIW and Sup r Scalar Architectures", International Conference on Computer Design, Austin, Sep. 17-20, 2000, pp. 163-172.
Iwasawa et al., "Parallelization Method of Fortran DO Loops by Parallelizing Assist System", Transactions of Information Processsings Society of Japan, vol. 36, No. 8, Aug. 1995, pp. 1995-2006.
Talla et al., "Execution Characteristics of Multimedia Applications on a Pentium II Process r", IEEE International Performance, Computing, and Communications Conference, 19th, Phoenix, F b. 20-22, 2000, pp. 516-524.
IBM Research Disclosure Bulletin 444188, "Enable Debuggers as an Objective Performance Measurement Tool for Software Development Cost Reduction", Apr. 2001, pp. 686-688.
U.S. Appl. No. 09/435,069, Davidson et al., Method and Apparatus for Instruction Sampling for Performance Monitoring and Debug, Nov. 4, 1999.
U.S. Appl. No. 08/538,071, Gover et al., Method and System for Selecting and Distinguishing an Event Sequence using an Eff ctive Address in a Processing Syst m, Oct. 2, 1995.
DeWitt, Jr. et al., Method and Apparatus for Counting Instruction Execution and Data Accesses, Sep. 30, 2003.
Levine et al., Method and Apparatus for Selectively Counting Instructions and Data Accesses, Sep. 30, 2003.
DeWitt, Jr. et al., Method and Apparatus for Generating Interrupts Upon Execution of Marked Instructions and Upon Access to Marked Memory Locations, Sep. 30, 2003.
DeWitt, Jr. et al., Method and Apparatus for Counting Data Accesses and Instruction Executions that Exceed a Threshold, Sep. 30, 2003.
DeWitt, Jr. et al., Method and Apparatus for Counting Execution of Specific Instructions and Accesses to Specific Data Locations, Sep. 30, 2003.
DeWitt, Jr. et al., Method and Apparatus for Debug Support for Individual Instructions and Memory Locations, Sep. 30, 2003.
Levine et al., Method and Apparatus to Autonomically Select Instructions for Selective Counting, Sep. 30, 2003.
Levine et al., Method and Apparatus to Autonomically Count Instruction Execution for Applications, Sep. 30, 2003.
Levine et al., Method and Apparatus to Autonomically Take an Exception on Specified Instructions, Sep. 30, 2003.
Levine et al., Method and Apparatus to Autonomically Profile Applications, Sep. 30, 2003.
DeWitt, Jr. et al., Method and Apparatus for Counting Instruction and Memory Location Ranges, Sep. 30, 2003.
DeWitt, Jr. et al., Method and Apparatus for Qualifying Collection of Performance Monitoring Events by Types of Interrupt when Interrupt Occurs.
DeWitt, Jr. et al., Method and Apparatus for Counting Interrupts by Type.
Tanenbaum, "Structured Computer Organization", 1984, Prentice-Hall, Inc., 2nd Edition, pp. 10-12.
Torrellas et al., "False Sharing and Spatial Locality in Multiprocessor Caches", Jun. 1994, IEEE Transactions on Computers, vol. 43, No. 6, pp. 651-663.
Rothman et al., "Analysis of Shared Memory Misses and Reference Patterns", 2000, IEEE, pp. 187-198.
Merten et al., "A Hardware Driven Profiling Scheme for Identifying Program Hot Spots to Support Runtime Optimization", IEEE, 1999, pp. 136-137.
"Method for the dynamic prediction of nonsequential memory accesses", Sep. 25, 2002, pp. 1-4, ip.com IPCOM000009888D.
"Cache Miss Director— A Means of Prefetching Cache Missed Lines", Aug. 1, 1982, IBM Technical Disclosure Bulletin, vol. 25, Issue 3A, p. 1286.

* cited by examiner

METHOD AND SYSTEM FOR RECORDING EVENTS OF AN INTERRUPT USING PRE-INTERRUPT HANDLER AND POST-INTERRUPT HANDLER

CROSS REFERENCE TO RELATED APPLICATIONS

The present invention is related to the following applications entitled "Method and Apparatus for Counting Instruction Execution and Data Accesses", Ser. No. 10/675,777, filed on Sep. 30, 2003; "Method and Apparatus for Selectively Counting Instructions and Data Accesses", Ser. No. 10/674,604, filed on Sep. 30, 2003; "Method and Apparatus for Generating Interrupts Upon Execution of Marked Instructions and Upon Access to Marked Memory Locations", Ser. No. 10/675,831, filed on Sep. 30, 2003; "Method and Apparatus for Counting Data Accesses and Instruction Executions that Exceed a Threshold", Ser. No. 10/675,778, filed on Sep. 30, 2003; "Method and Apparatus for Counting Execution of Specific Instructions and Accesses to Specific Data Locations", Ser. No. 10/675,776, filed on Sep. 30, 2003; "Method and Apparatus for Debug Support for Individual Instructions and Memory Locations", Ser. No. 10/675,751, filed on Sep. 30, 2003; "Method and Apparatus to Autonomically Select Instructions for Selective Counting", Ser. No. 10/675,721, filed on Sep. 30, 2003; "Method and Apparatus to Autonomically Count Instruction Execution for Applications", Ser. No. 10/674,642, filed on Sep. 30, 2003; "Method and Apparatus to Autonomically Take an Exception on Specified Instructions", Ser. No. 10/674,606, filed on Sep. 30, 2003; "Method and Apparatus to Autonomically Profile Applications", Ser. No. 10/675,783, filed on Sep. 30, 2003; "Method and Apparatus for Counting Instruction and Memory Location Ranges", Ser. No. 10/675,872, filed on Sep. 30, 2003; "Method and Apparatus for Qualifying Collection of Performance Monitoring Events by Types of Interrupt When Interrupt Occurs", Ser. No. 10/757,186, filed on Jan. 14, 2004; and "Method and Apparatus for Counting Interrupts by Type", Ser. No. 10/757,198, filed on Jan. 14, 2004. All of the above related applications are assigned to the same assignee, and incorporated herein by reference.

BACKGROUND OF THE INVENTION

1. Technical Field

The present invention relates generally to an improved data processing system and, in particular, to a method and system for monitoring performance of the processor in a data processing system when an interrupt occurs. Still more particularly, the present invention relates to a method, apparatus, and computer instructions for providing pre handlers and post handlers to record events.

2. Description of Related Art

A typical data processing system utilizes processors to execute a set of instructions in order to perform a certain task, such as reading a specific character from the main memory. However, as the number of tasks required to be executed by the processor increases, the efficiency of the processor's access patterns to memory and the characteristics of such access become important factors for engineers who want to optimize the system.

Currently, the prior art contains mechanisms that can count occurrences of software-selectable events, such as, for example, cache misses, instructions executed, I/O data transfer request, and the time a given process may take to execute within a data processing system. One such mechanism is a performance monitor. A performance monitor monitors selected characteristics for system analysis by determining a machine's state at a particular time. This analysis provides information of how the processor is used when instructions are executed and its interaction with the main memory when data is stored. This analysis may also be used to determine if application code changes, such as a relocation of branch instructions and memory access, to further optimize the performance of a system are necessary. In addition, the performance monitor may provide the amount of time that has passed between events in a processing system. The performance monitor counts events that may be used by engineers to analyze system performance. Moreover, data regarding how the processor accesses the data processing system's level 1 and level 2 cache, and main memory may be gathered by the performance monitor in order to identify performance bottlenecks that are specific to a hardware or software environment.

In addition to the performance monitor described above, an interrupt processing unit may be used to record events such as, for example, instruction execution, branch events, or system events when an interrupt occurs. An interrupt occurs when a device, such as a mouse or keyboard, raises an interrupt signal to notify the processor that an event has occurred. When the processor accepts an interrupt request, the processor completes its current instruction and passes the control to an interrupt handler. The interrupt handler executes an interrupt service routine that is associated with the interrupt. An interrupt may also be caused by a specific machine language operation code, for example Motorola 68000's TRAP, a product from Motorola, Inc. In this case, an unexpected software condition such as divide by zero causes the processor to store the current state, store identifying information about the particular interrupt and pass control to an interrupt handler that handles this unexpected software condition.

However, the performance monitor above must modify the application program at run time in order to record precise performance trace data, such as the number of instructions executed during interrupt processing. Therefore, it would be advantageous to have an improved method, apparatus, and computer instructions for providing pre and post handlers to record precise performance data for events occurring before entering and immediately after exiting an interrupt handler without modifying underlying application program.

SUMMARY OF THE INVENTION

The present invention provides a method, apparatus, and computer instructions for providing pre and post handlers to record events when an interrupt occurs. The pre and post handlers allow logging of trace records along with timestamps associated with performance monitoring events to be recorded in order to provide the user with more fine-grained performance data.

In a preferred embodiment, the mechanism of the present invention provides pre and post handlers to record the occurrence of performance monitoring events when a branch instruction is executed. The pre and post handlers are used with a "trap on branch", i.e. a trap, or interrupt, being processed when a branch instruction is executed, to produce an instruction trace which includes the 'from' address of where the branch is taken and may include the 'to' address of where the branch branches to. It should be clear that information could be compressed in various ways to minimize the amount of information to be recorded. The pre and post handlers record performance monitoring events occurring prior to and immediately after taking the branch.

In an alternative embodiment, before the processor fetches instructions from the interrupt handler when an interrupt occurs, the mechanism of the present invention allows the pre handler to log trace records prior to entering the interrupt handler. The events recorded provide the state of the system when entering an interrupt handler.

When the interrupt handler completes the interrupt service routine, the mechanism of the present inventions allows the post handler to record events and low level information, such as the number of instructions executed for an interrupt, before returning to normal execution. This low-level information may provide the state of the system when exiting an interrupt.

These and other features and advantages will be discussed in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The mechanism of the present invention provides pre and post handlers to log trace records, including the 'from' address of where an interrupt occurs or where a branch instruction is executed. The pre and post handlers record events, such as performance monitoring events, prior to entering and after exiting an interrupt handler or taking a branch. By logging these trace records, engineers may identify values of performance monitoring events at a particular instant in time. These records may assist engineers in isolating events that occur during normal execution of the system from events that occur in the system when an interrupt is handled or when a branch is taken.

Figure 1:
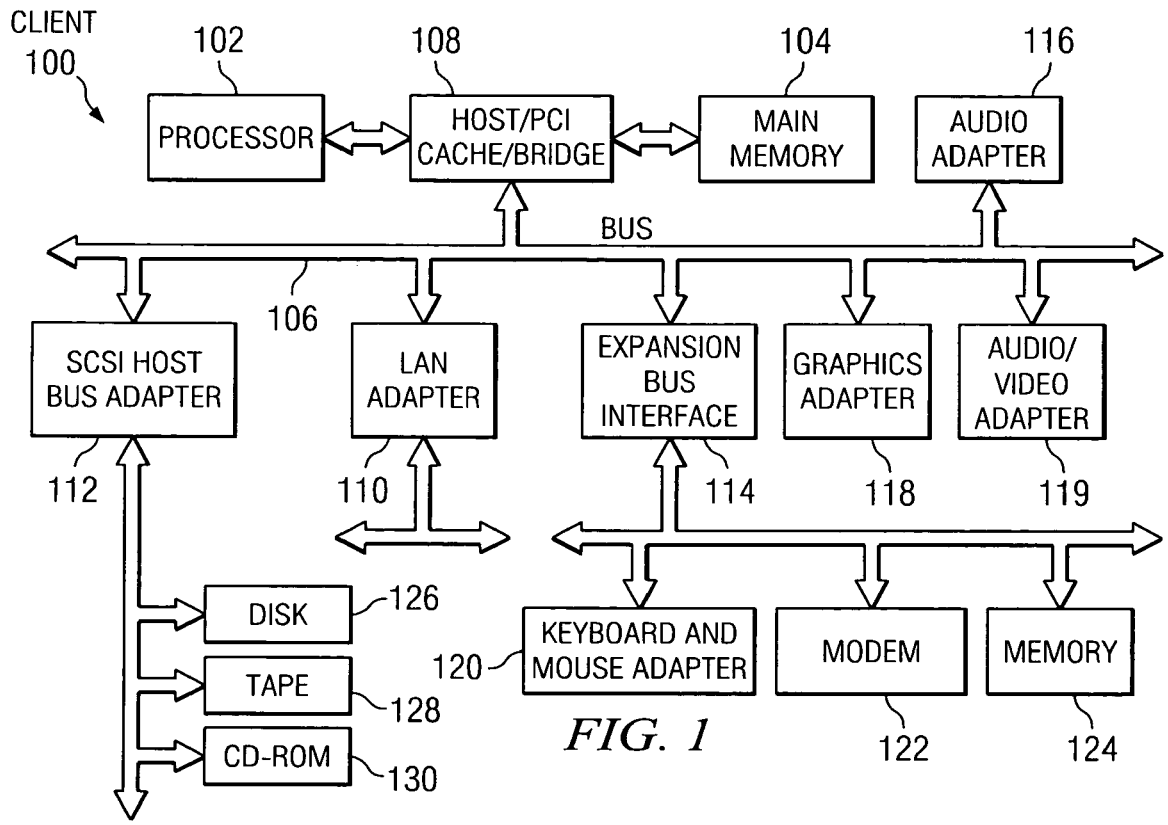
FIG. 1 is an exemplary block diagram of a data processing system in which the present invention may be implemented.

The present invention may be implemented in a computer system. The computer system may be a stand-alone computing device, a client or server computing device in a client-server environment that is interconnected over a network, or the like. FIG. 1 provides an exemplary diagram of a computing device in which aspects of the present invention may be implemented. FIG. 1 is only exemplary and no limitation on the structure or organization of the computing devices on which the present invention may be implemented is asserted or implied by the depicted example.

With reference now to FIG. 1, an exemplary block diagram of a data processing system is shown in which the present invention may be implemented. Client 100 is an example of a computer, in which code or instructions implementing the processes of the present invention may be located. Client 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards.

In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on client 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, client 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, client 100 may be a stand-alone system configured to be bootable without relying on some type of network communication interface, whether or not client 100 comprises some type of network communication interface. As a further example, client 100 may be a personal digital assistant (PDA), which is configured with ROM and/or flash ROM to provide non-volatile memory for storing operating system files and/or user-generated data. The depicted example in FIG. 1 and above-described examples are not meant to imply architectural limitations.

The processes of the present invention are performed by processor 102 using computer implemented instructions, which may be located in a memory such as, for example, main memory 104, memory 124, or in one or more peripheral devices 126–130.

Figure 2:
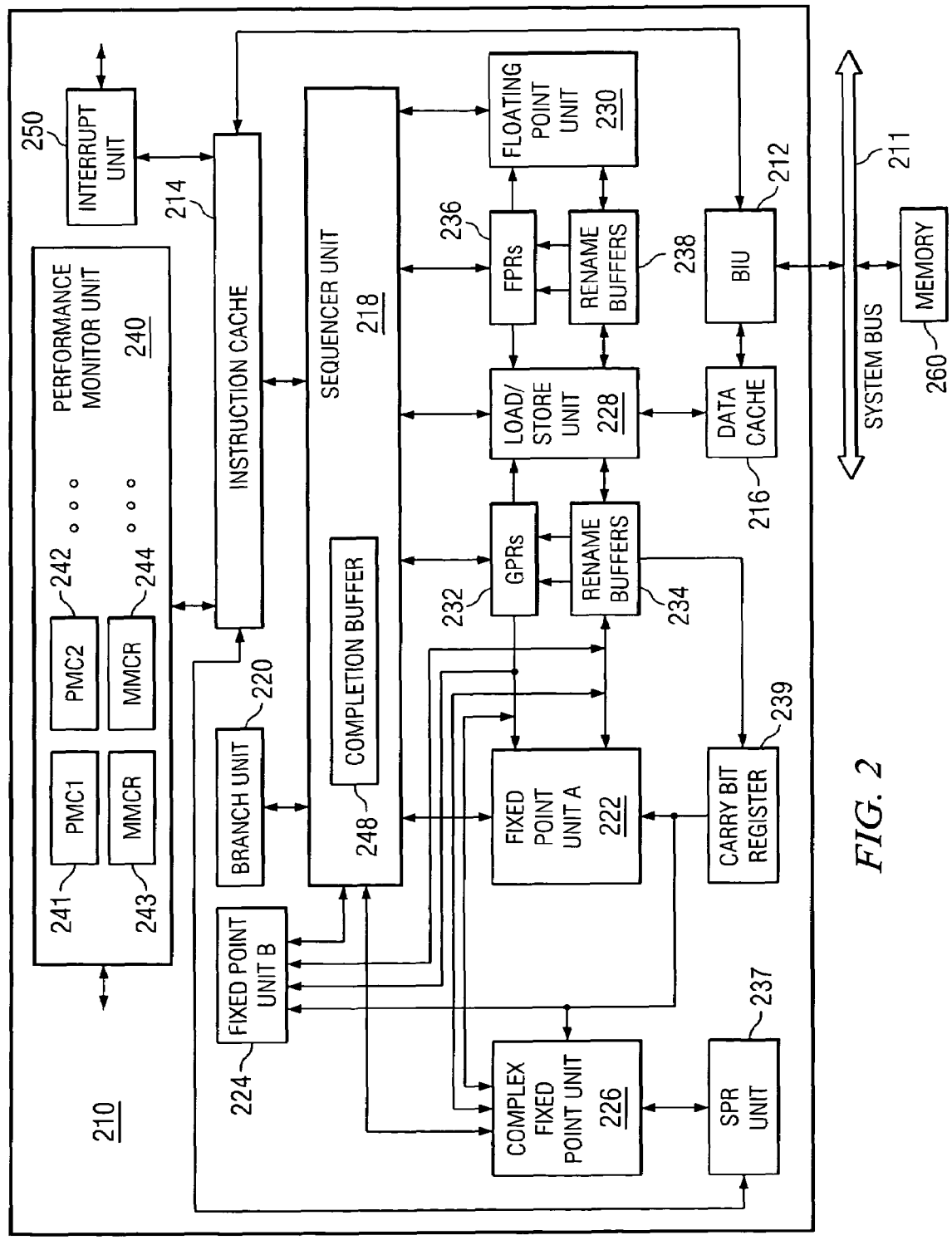
FIG. 2 is an exemplary block diagram of a processor system for processing information in accordance with a preferred embodiment of the present invention.

Turning next to FIG. 2, an exemplary block diagram of a processor system for processing information is depicted in accordance with a preferred embodiment of the present invention. Processor 210 may be implemented as processor 102 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer ("RISC") techniques. As shown in FIG. 2, system bus 211 is connected to a bus interface unit ("BIU") 212 of processor 210. BIU 212 controls the transfer of information between processor 210 and system bus 211.

BIU 212 is connected to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in the preferred embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a Load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 239 connected to system bus 211. Moreover, data cache 216 is able to output (through BIU 212 and system bus 211) information from data cache 216 to system memory 239 connected to system bus 211. In response to a Store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 239 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As information is stored at a selected one of rename buffers 234, such information is associated with a storage location (e.g. one of GPRs 232 or carry bit(CA) register 242) as specified by the instruction for which the selected rename buffer is allocated. Information stored at a selected one of rename buffers 234 is copied to its associated one of GPRs 232 (or CA register 242) in response to signals from sequencer unit 218. Sequencer unit 218 directs such copying of information stored at a selected one of rename buffers 234 in response to "completing" the instruction that generated the information. Such copying is called "writeback."

As information is stored at a selected one of rename buffers 238, such information is associated with one of FPRs 236. Information stored at a selected one of rename buffers 238 is copied to its associated one of FPRs 236 in response to signals from sequencer unit 218. Sequencer unit 218 directs such copying of information stored at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218.

In the decode stage, sequencer unit 218 decodes up to four fetched instructions.

In the dispatch stage, sequencer unit 218 selectively dispatches up to four decoded instructions to selected (in response to the decoding in the decode stage) ones of execution units 220, 222, 224, 226, 228, and 230 after reserving rename buffer entries for the dispatched instructions' results (destination operand information). In the dispatch stage, operand information is supplied to the selected execution units for dispatched instructions. Processor 210 dispatches instructions in order of their programmed sequence.

In the execute stage, execution units execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence.

In the completion stage, sequencer unit 218 indicates an instruction is "complete." Processor 210 "completes" instructions in order of their programmed sequence.

In the writeback stage, sequencer 218 directs the copying of information from rename buffers 234 and 238 to GPRs 232 and FPRs 236, respectively. Sequencer unit 218 directs such copying of information stored at a selected rename buffer. Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

Completion buffer 248 is provided within sequencer 218 to track the completion of the multiple instructions which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

In addition, processor 210 also includes performance monitor unit 240, which is connected to instruction cache 214 as well as other units in processor 210. Operation of processor 210 can be monitored utilizing performance monitor unit 240, which in this illustrative embodiment is a software-accessible mechanism capable of providing detailed information descriptive of the utilization of instruction execution resources and storage control. Although not illustrated in FIG. 2, performance monitor unit 240 is coupled to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, and cache hits.

Performance monitor unit 240 includes an implementation-dependent number (e.g., 2–8) of counters 241–242, labeled PMC1 and PMC2, which are utilized to count occurrences of selected events. Performance monitor unit 240 further includes at least one monitor mode control register (MMCR). In this example, two control registers, MMCRs 243 and 244 are present that specify the function of counters 241–242. Counters 241–242 and MMCRs 243–244 are preferably implemented as SPRs that are accessible for read or write via MFSPR (move from SPR) and MTSPR (move to SPR) instructions executable by CFXU 226. However, in one alternative embodiment, counters 241–242 and MMCRs 243–244 may be implemented simply as addresses in I/O space. In another alternative embodiment, the control registers and counters may be accessed indirectly via an index register. This embodiment is implemented in the IA-64 architecture in processors from Intel Corporation.

Additionally, processor 210 also includes interrupt unit 250, which is connected to instruction cache 214. Additionally, although not shown in FIG. 2, interrupt unit 250 is connected to other functional units within processor 210. Interrupt unit 250 may receive signals from other functional units and initiate an action, such as starting an error handling or trap process. In these examples, interrupt unit 250 is employed to generate interrupts and exceptions that may occur during execution of a program.

The present invention provides a method, apparatus, and computer instructions for providing pre and post handlers to record events. The pre and post handlers may perform different operations to obtain different computer program execution metric information for use by a performance analysis tool in providing analysis of the computer program's performance during execution. The pre handler is intended to be used to obtain information about computer program execution metrics as they are prior to execution of interrupt handling routines. The post handler is intended to be used to obtain information about what occurs during the handling of an interrupt, i.e. during execution of the interrupt handling routines.

A trap, i.e. a piece of code that executes when a particular condition has occurred, such as a when a particular interrupt or exception has been generated, etc also is referred to herein as a trap or an interrupt service routines.

With the present invention, as part of handling this trap, the processor of the present invention calls a pre handler prior to calling the trap or interrupt handling routines. That is, when the trap instruction generates an interrupt, or otherwise attempts to transfer control to a trap handling routine, the processor redirects this call to a pre handler which may accumulate or otherwise obtain performance monitoring metric information from performance monitor mechanisms associated with the computer program. This information may then be stored for identifying the state of the execution of the computer program prior to the trap or interrupt handler having been executed.

Similarly, when a trap occurs and the trap or interrupt handling routine has been executed, the post handler may be executed after execution of the trap or interrupt handling routine to obtain information about what occurred during execution of the trap or interrupt handling routine. For example, the post handler may add the number of instructions or cache misses that occurred in the interrupt handler itself to accumulate a total value that can be output to the performance analysis tool for use during performance analysis of the computer program. In order to perform different operations, the pre and post handlers process performance monitor metric information, hereafter referred to as "performance information", using values of events that occurred and timestamps associated with the events.

In addition, the pre and post handlers may log trace records. A trace record may include a 'from' address of the instruction where an event occurs as well as counts for a selected event, and a time stamp identifying when the trace record is being written. Events recorded may include performance monitoring events occurring before entering and after exiting an interrupt service routine. The pre and post handlers are instruction routines that log trace records or process information about the state of the machine. Trace records may also include information read from performance monitoring counters, such as counters 241–242 in FIG. 2, and timestamps associated for each event. Examples of performance monitoring events are the number of instructions executed, the number of cache misses, the number of table lookaside buffer (TLB) misses, etc.

The pre and post handlers accumulate trace records for events that occur prior to and during the execution of the interrupt service routine, or trap/interrupt handling routine, by recording the values of performance monitor counters before executing the handler and recording the values of the performance monitor counters right after executing the handler. The performance monitor may be programmed to stop counting events while the pre and post handlers are being executed.

The pre and post handlers of the present invention may be enabled or disabled. As a result, customized performance monitoring information may be obtainable by determining which pre and post handlers to enable or disable. In this way, a user may obtain performance information that is of particular interest to the problems of importance to that user. This permits a great deal of flexibility with regard to what performance monitoring information is compiled and analyzed by pre and post handlers.

In addition, the pre and post handler routines may also be used with "trap on branch" instructions to produce a trace record. As touched upon above, a trap is a specialized piece of code in a program that occurs due to a particular condition in a running program.

A "trap on branch", otherwise referred to as a "branch trap", is a trap that occurs if a branch is taken. If the branch is taken, then the trap on branch handler receives control.

In a preferred embodiment of the present invention, one or more branches in the computer program being monitored are selected for monitoring. When one of these branch instructions selected for monitoring is executed, i.e. when the branch is taken, the processor sends a signal to the interrupt unit. Rather than fetching instructions from the normal trap handling routine, the interrupt unit notifies the processor to fetch instructions from the pre handler to log trace records prior to executing the trap handling routine and taking the branch, if the pre handler is enabled.

A trace record may include a 'from' memory address, which is the memory address of the branch instruction when the branch is taken. In addition, the trace record may also include a 'to' memory address, which is the memory address of where to branch to. Associated with these addresses may be performance monitoring information that may be obtained from performance monitoring devices and data structures, e.g., counters 241–242. An example of performance monitoring information that may be obtained and associated with the 'to' and/or 'from' and from addresses is selected counts of performance monitoring events, such as the number of cache misses that have occurred.

After the pre handler routine is executed, the normal trap service routine, or trap handler routine, is be executed. A post handler routine may also be associated with the trap that is placed in the program. This post handler routine is called after the normal trap service routine has finished executing and attempts to return control of the computer program to the normal code of the computer program. Upon completion of the normal trap service routine, and prior to returning to normal execution, the processor sends a signal to the interrupt unit indicating completion of the normal trap service routine. As a result, if the post handler is enabled, the interrupt unit notifies the processor to fetch instructions from the post handler in order to log trace records after taking the branch. Thus, the pre and post handlers allow the user to record low-level performance data prior to and immediately after execution of a trap/interrupt handling routine. One preferred application of this functionality is for the "trap on branch" conditions discussed above.

Normally, when an interrupt occurs, such as when a page fault occurs during program execution, the processor stops the current execution and begins fetching instructions from the address of the entry point to the interrupt handler. An interrupt handler includes interrupt service routines that are fetched by the processor to handle an interrupt. The address of the entry point is stored in the interrupt descriptor table (IDT) which is a system table that associates each interrupt with a corresponding interrupt handler containing corresponding interrupt service routines.

However, in one exemplary embodiment of the present invention, in response to the occurrence of an interrupt event that causes an interrupt to be generated, the interrupt unit of the present invention receives an interrupt signal from the processor with associated metadata. This metadata may include handler flags, e.g., non-zero values that identify one of the following interrupt handlers: normal interrupt handler, pre handler, or post handler.

If a pre handler flag is set in the metadata, rather than fetching instructions from the normal interrupt handler as described above, the interrupt unit notifies the processor to fetch instructions from the pre handler routine that records trace data occurring prior to execution of the "normal" interrupt handler, at a particular instant of time. A "normal" interrupt handler, as the term is used in this description, refers to the interrupt handling routine that would execute based on the interrupt generated if the pre and/or post flags were not set.

The trace data generated by the pre handler routine may include a 'to' and/or 'from' address of the instruction where the interrupt occurs and selected performance monitoring information. A timestamp may also be included in the trace record.

Once the pre handler routine is executed, the pre handler notifies the processor to fetch instructions from the normal interrupt handler. When the normal interrupt handler execution is complete, if the post handler flag is set, the interrupt unit of the present invention notifies the processor to fetch instructions from the post handler to record trace data for an interrupt at a particular instant of time after the normal interrupt handler.

In this way, the pre and post handlers allow trace data specific to a particular trap or interrupt at a particular instant of time to be recorded without making modification to any operating system routines. Using the pre and post handlers, trace records may be logged prior to execution of a normal trap or interrupt handling routine, such as in response to the taking of a branch, and immediately after execution of a normal trap or interrupt handling routine. From the information generated by the pre and post handlers, a picture of what is happening in the computer program execution between the time when a branch instruction is executed to the time when a branch is taken, and between the time after a branch is taken and returning to normal execution, may be obtained.

In addition, performance trace data may be recorded at the entrance and exit of the normal trap or interrupt handling routine in order to identify changes that occur between the time when a particular interrupt occurs to the start of the trap or interrupt handling routine. In addition, changes that occur between the end of the trap or interrupt handling routine and the interrupt return may also be identified. This information provides engineers with a tool to separate events that occur during normal execution of the system from events that occur when the system is interrupted or a branch is taken.

In yet another preferred embodiment, the pre and post handler routines may be implemented to perform other functions, such as handling overflow of the count used by the performance monitoring unit to count events. The performance monitoring unit may be implemented as performance monitoring unit 240 in FIG. 2. The count may be stored either in the IDT or in a dedicated memory location outside of the IDT. Because an overflow may occur during counting of events, the pre and post handler routines may look up the value of the count periodically to check for overflow. In one embodiment, if the value of the count is about to wrap, the pre and post handler routines may signal the processor that an overflow will occur. In another embodiment, the pre and post handlers may include routines that handle the overflow, for example, by reading and resetting the count value.

Figure 3:
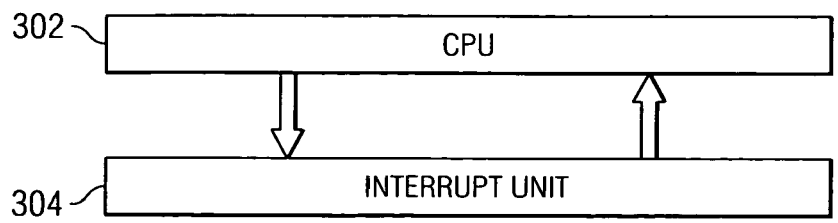
FIG. 3 is an exemplary diagram illustrating components for recording events of an interrupt using pre and post handler in accordance with a preferred embodiment of the present invention.

Turning next to FIG. 3, an exemplary diagram illustrating components for recording events of an interrupt using pre and post handler is depicted in accordance with a preferred embodiment of the present invention. In this example implementation, the central processing unit (CPU) 302 may be implemented as processor 210 in FIG. 2. In a preferred embodiment, when a branch instruction is executed, a trap is executed by the application program. The trap notifies CPU 302 to generate and send a signal to interrupt unit 304 indicating that an exception has occurred, meaning the branch instruction is executed. Interrupt unit 304 notifies CPU 302 to fetch instructions from the pre handler to record trace data prior to taking a branch. The pre handler routine records trace data, which may include a 'from' address where the branch instruction is executed, the 'to' address of where to branch and performance information, e.g., count values, of selected performance events that occurred, prior to taking a branch.

After the execution of the trap handling routine, an indication of the completion of the trap handling routine is returned to the interrupt unit 304. The interrupt unit 304 then notifies CPU 302 to fetch instructions from the post handler to record trace data prior to returning to normal execution.

In an alternative embodiment, when an interrupt occurs, such as when a cache miss occurs during program execution, CPU 302 sends a signal to interrupt unit 304 with associated metadata that identifies the type of interrupt, which is used to identify the particular interrupt handling routine that is to be executed to handle the interrupt. Interrupt unit 304 may then identify the address in the IDT and notifies the processor to fetch instructions from the interrupt handling routine at the address identified in the IDT based on the interrupt type indicated in the metadata. This may involve fetching instructions from an address for a pre and/or post handler that is stored in association with the handler identified by the metadata, as described hereafter.

Figure 4:
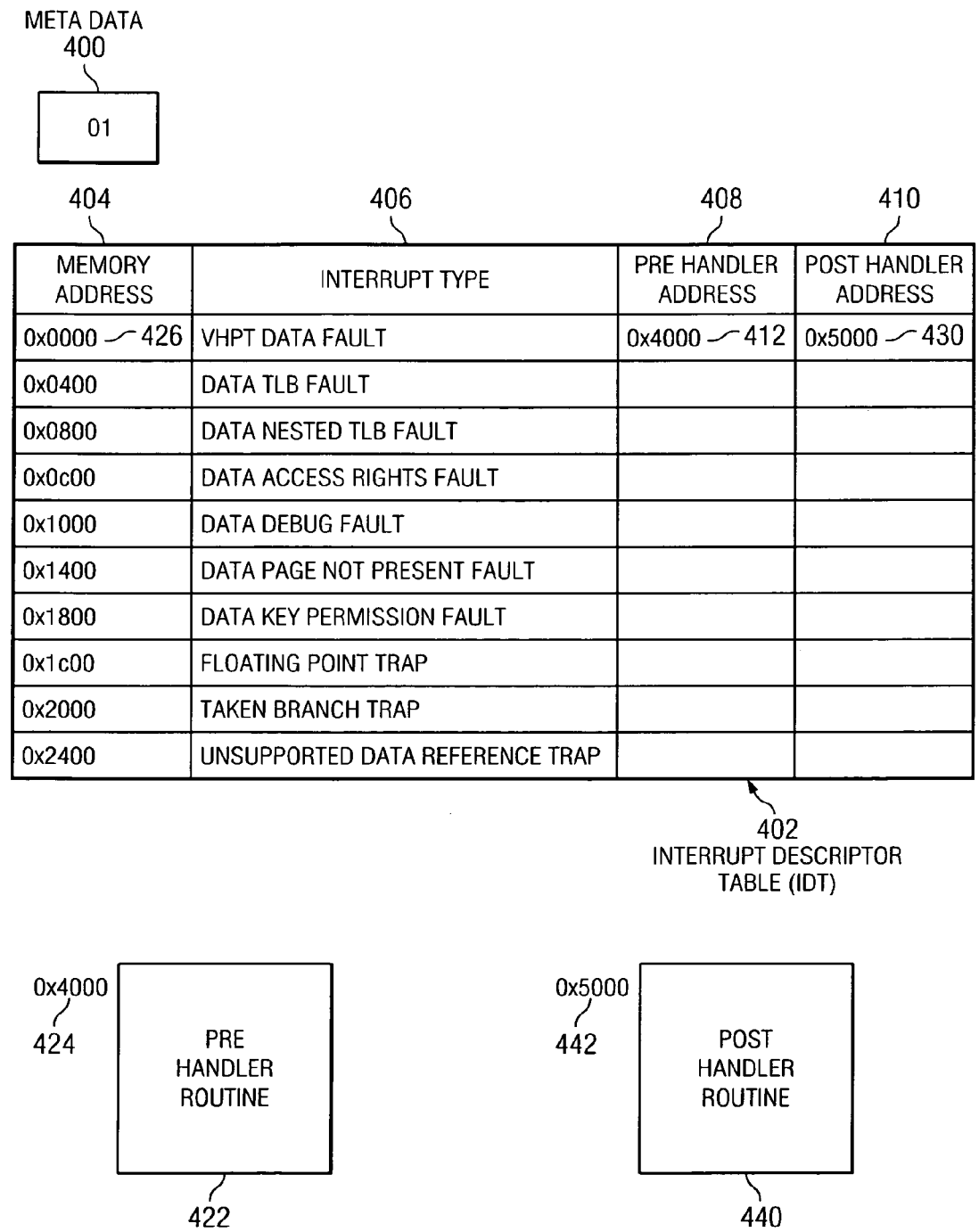
FIG. 4 is an exemplary diagram illustrating an example interrupt description table (IDT) in accordance with a preferred embodiment of the present invention.

Turning next to FIG. 4, an exemplary diagram illustrating an example interrupt description table (IDT) is depicted in accordance with a preferred embodiment of the present invention. In this example implementation, an interrupt descriptor table (IDT) 402 includes memory addresses 404, interrupt types 406, pre handler addresses 408 and post handler addresses 410. Interrupt types 406 represented in IDT 402 are for illustrative purpose only.

In this example, when an interrupt occurs such as, for example, a Virtual Hash Page Table (VHPT) data fault interrupt, which is an interrupt associated Virtual Hash Page Table, the processor sends a signal identifying the occurrence of the interrupt to an interrupt unit, such as interrupt unit 304 in FIG. 3. The interrupt unit checks metadata 400 associated with the signal to determine if pre or post handlers are enabled for handling the identified interrupt. In this example, the metadata is 01, which means the pre handler is enabled. If the metadata is 00, the normal interrupt handler is enabled; if the metadata is 10, the post handler is enabled. If the metadata is set to 11, both the pre handler and the post handler are enabled.

Whether the metadata is set to 01, 00, 10 or 11 may be determined based on, for example, a data structure associated with the performance monitoring applications that are used to monitor the execution of the computer program. That is, a user may set whether pre handlers, post handlers, both, or neither are enabled for a particular type of event or for a particular trace, via user input to the performance monitoring application. This information may be stored in a data structure associated with the performance monitoring application which may be accessed to set registers associated with the processor indicating whether to enable pre handlers, post handlers, both or neither.

Alternatively, this information may be maintained in a data structure that is accessed by the processor or the interrupt unit each time there is a trap or interrupt generated to determine whether that particular trap or interrupt is associated with an enabled pre handler, post handler, both or neither. This data structure may be, for example, the IDT, a shadow IDT data structure, or other data structure. In another embodiment, a register may be used to indicate the address of a pre handler and a different register for a post handler. The value of zero means there is no pre or post handler and a non-zero value indicates the address of the pre or post handler. This approach allows one pre handle and one post handler for all traps.

If the pre handler is enabled, the interrupt unit identifies the pre handler routine address 408, in this example 0×4000 412, from pre handler address field 408 of IDT 402 associated with the interrupt type indicated in the received signal from the processor and executes the corresponding pre handler routine 422 starting at memory address 0×4000 424 to record events.

Once pre handler routine 422 is executed, the interrupt unit identifies starting memory address 404 of the VHPT data fault interrupt service routine from memory address field 404 of IDT 402, in this example 0×0000 426 and notifies the processor to execute the normal interrupt service routine of the interrupt handler. Once the normal interrupt service routine is complete, the processor sends a signal to the interrupt unit 304 in FIG. 3. The interrupt unit checks metadata 400, which is associated with the signal sent by the processor in response to the interrupt occurring, to determine whether the post handler is also enabled.

If the post handler is enabled, the interrupt unit 304 identifies post handler routine starting address 410, in this example 0×5000 442, from post handler address field 410 of IDT 402. The interrupt unit then notifies the processor to execute corresponding post handler routine 440 starting at memory address 0x5000 442 to record events. Once post handler routine 440 is executed, the interrupt unit then notifies the processor to return to the original instructions of the computer program that caused the interrupt.

Figure 5:
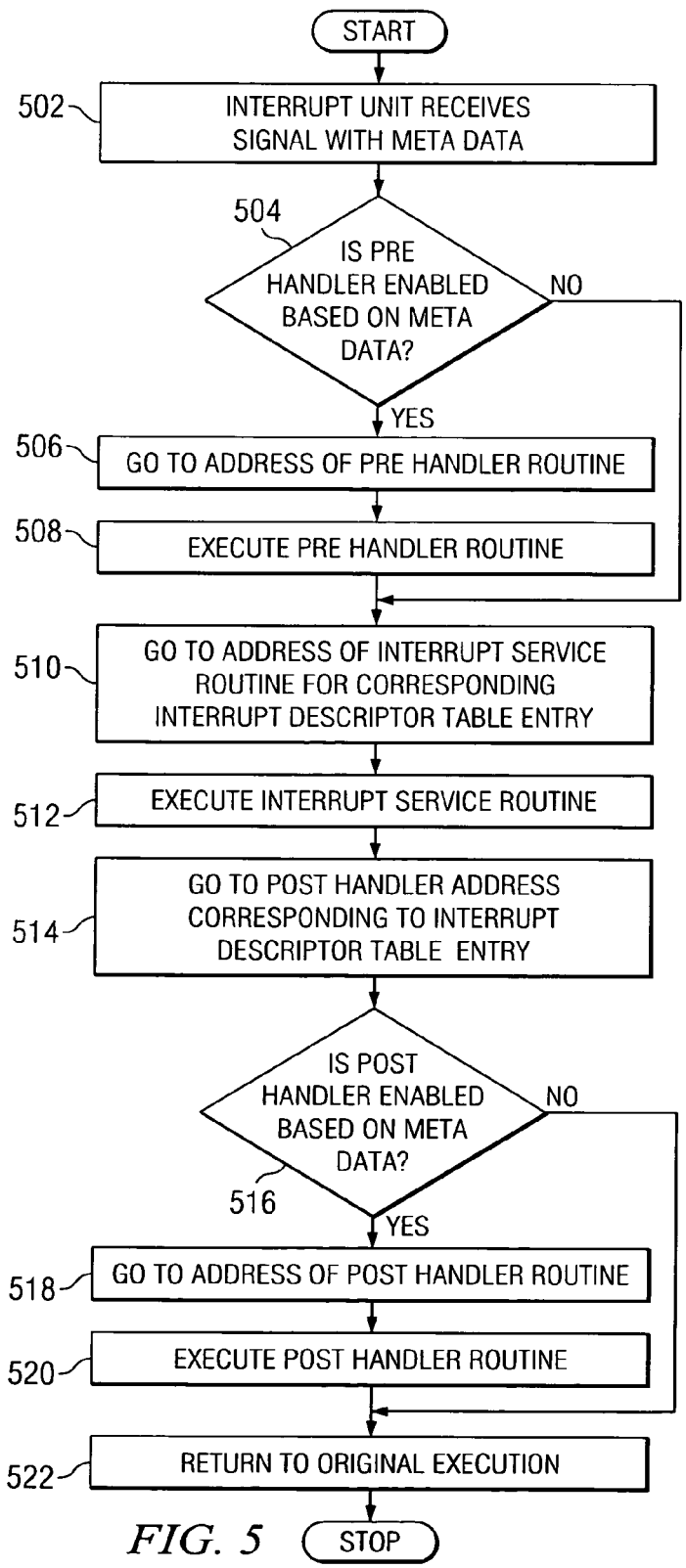
FIG. 5 is a flowchart outlining an exemplary process for recording events of an interrupt using pre and post handlers in accordance with a preferred embodiment of the present invention.

Turning next to FIG. 5, a flowchart outlining an exemplary process for recording events of an interrupt using pre and post handlers from the interrupt unit's perspective is depicted in accordance with a preferred embodiment of the present invention. The process begins when the processor, in response to executing a trap instruction or an interrupt being generated, sends a signal with associated metadata to the interrupt unit (step 502). Next, a determination is made as to whether the pre handler is enabled based on the metadata associated with the signal (step 504) by examining the flag set in the metadata. If the pre handler is not enabled, the interrupt unit identifies the memory address of the normal interrupt handling routine, such as memory address 404 in FIG. 4, corresponding to the interrupt type, such as interrupt type 406 in FIG. 4 (step 510) in the IDT, such as IDT 402 in FIG. 4 and notifies the processor to execute the interrupt handling routine (step 512).

If the pre handler is enabled, the interrupt unit identifies the starting address of the pre handler routine (step 506) and notifies the processor to execute the pre handler routine (step 508) to record events. The interrupt unit then notifies the processor the memory address of the interrupt handling routine corresponding to the interrupt type (step 510) in the IDT, in order to execute the interrupt handling routine (step 512).

Once the processor executes the interrupt handling routine, the interrupt unit then identifies the post handler address that corresponds to the interrupt type or IDT entry in the IDT (step 514). A determination is made as to whether the post handler is enabled based on the metadata (step 516). If the post handler is not enabled, the interrupt unit notifies the processor to return to the original execution (step 522). The process terminates thereafter.

If the post handler is enabled, the interrupt unit identifies the starting address of the post handler routine (step 518). The interrupt unit then notifies the processor to execute the post handler routine (step 520) to record events before returning to original execution (step 522). The process then terminates thereafter.

Figure 6:
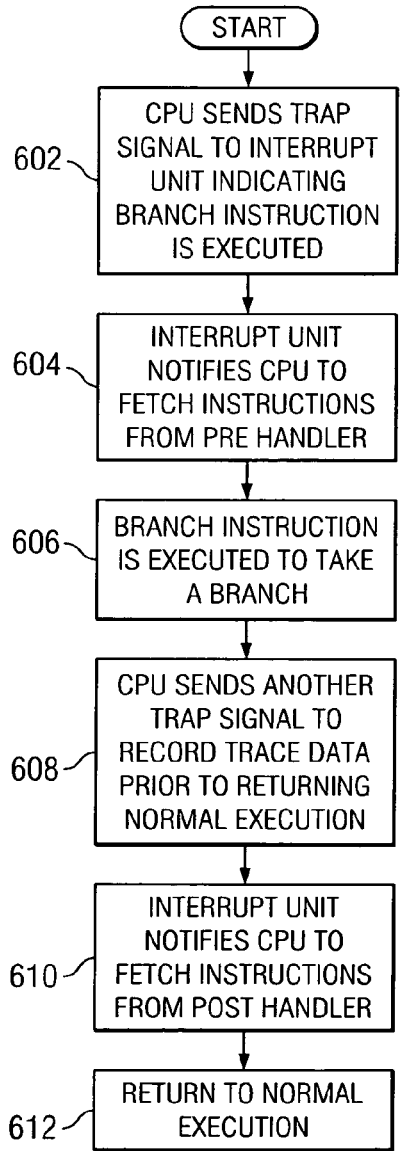
FIG. 6 is a flowchart outlining an exemplary process for logging trace records when a branch instruction is executed with trap on branch using pre and post handlers in accordance with a preferred embodiment of the present invention.

Turning next to FIG. 6, a flowchart outlining an exemplary process for logging trace records when a branch instruction is executed with trap on branch using pre and post handlers from the interrupt unit's perspective is depicted in accordance with a preferred embodiment of the present invention. The process begins when the processor, in response to a branch instruction being executed, sends a signal to the interrupt unit indicating that a branch instruction is executed (step 602). The interrupt unit, such as interrupt unit 304 in FIG. 3, then notifies the processor to execute instructions from the pre handler routine (step 604). Next, the branch instruction is executed to take a branch (step 606). Consequently, the interrupt unit notifies the processor to execute instructions from the post handler to record trace data (step 610) prior to returning to normal execution (step 612), the process terminating thereafter.

Thus, the present invention provides a solution of recording performance data without modifying application and/or system code at run time. Pre and post handlers are provided to process performance information in various ways. One example may be by accumulating values of events that occurred to be used by a performance analysis tool. In addition, the pre and post handler may record trace data with "trap on branch" conditions when a branch instruction is executed. The pre and post handler may also be used to record precise performance data for events occurring before entering and immediately after exiting an interrupt handler. The recorded values provide engineers with a tool to separate events that occur during normal execution of the system from events that occur when the system is interrupted, in order to better optimize the system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of processing performance information in a data processing system, comprising the steps of:
   receiving an interrupt signal at an interrupt unit of a processor of the data processing system;
   determining if at least one of a pre handler routine and a post handler routine are enabled for an interrupt;
   invoking the pre handler routine to record events at a first instant if the pre handler routine is enabled;
   invoking an interrupt handler routine following execution of the pre handler routine; and
   invoking the post handle routine following execution of the interrupt handler routine to record events at a second instant if the post handler routine is enabled.

2. The method of claim 1, wherein recording events includes recording a plurality of counts.

3. The method of claim 1, wherein recording events includes recording a timestamp.

4. The method of claim 1, wherein the first and second instants are associated with first and second timestamps, respectively.

5. The method of claim 1, further comprising a plurality of pre handler routines and a plurality of post handler routines, wherein each pre handler routine and each post handler routine records a different event on the occurrence of an interrupt.

6. The method of claim 1, wherein recording events includes accumulating a total value of counts.

7. The method of claim 2, wherein the count represents the number of times an event occurs.

8. The method of claim 2, wherein the count is not updated when the pre or post handler routine is invoked.

9. The method of claim 7, wherein the event is selected from the group consisting of cache misses and number of instructions executed.

10. The method of claim 6, wherein the total value of counts is accumulated by adding counts of events recorded.

11. The method of claim 6, wherein the total value of counts is displayed in a performance analysis tool.

12. A method of executing instructions in a data processing system, comprising the steps of:
receiving an interrupt signal at an interrupt unit of a processor of the data processing system;
determining if at least one of a pre handler routine and a post handler routine are enabled for an interrupt;
invoking the pre handler routine to log a trace record at a first instant if the pre handler routine is enabled;
invoking an interrupt handler routine following execution of the pre handler routine; and
invoking the post handler routine following execution of the interrupt handler routine to log a trace record at a second instant if the post handler routine is enabled.

13. The method of claim 12, wherein the trace record includes a from address of an instruction indicating where the interrupt occurs.

14. The method of claim 12, wherein the trace record includes a plurality of counts.

15. The method of claim 12, wherein the trace record includes a timestamp.

16. The method of claim 12, further comprising a plurality of pre handler routines and a plurality of post handler routines, wherein each pre handler routine and each post handler routine logs a different event on the occurrence of an interrupt.

17. The method of claim 12, wherein the first and second instants are associated with first and second timestamps, respectively.

18. The method of claim 14, wherein the count represents the number of times an event occurs.

19. The method of claim 18, wherein the event is selected from the group consisting of cache misses and clock cycles.

20. A method of executing instructions in a data processing system, comprising the steps of:
receiving an interrupt signal at an interrupt unit of a processor of the data processing system;
determining if at least one of a pre handler routine and a post handler routine are enabled for an interrupt;
invoking the pre handler routine to log a trace record at a first instant if the pre handler routine is enabled;
invoking an interrupt handler routine; and
invoking the post handler routine to log a trace record at a second instant if the post handler routine is enabled, wherein the pre handler routine or the post handler routine monitors a count of recorded events to determine if an overflow occurred.

21. The method of claim 20, wherein the pre handler routine or the post handler routine handles the overflow by reading and resetting the count.

22. A data processing system, comprising:
an interrupt unit for receiving interrupt signals;
a pre handler routine and a post handler routine;
wherein responsive to receiving an interrupt signal for an interrupt at the interrupt unit, and prior to execution of an interrupt routine, the pre handler routine logs a trace record at a first instant; and
wherein responsive to completion of execution of the interrupt routine, the post handler routine logs a trace record at a second instant.

23. The system of claim 22, wherein the trace record includes a from address of an instruction indicating where the interrupt occurs.

24. The system of claim 22, wherein the trace record includes a plurality of counts.

25. The system of claim 22, wherein the trace record includes a timestamp.

26. The system of claim 22, further comprising a plurality of pre handler routines and a plurality of post handler routines, wherein each pre handler routine and each post handler routine logs a different event on the occurrence of an interrupt.

27. The system of claim 22, wherein the first and second instants are associated with first and second time stamps, respectively.

28. The system of claim 24, wherein the count represents the number of times an event occurs.

29. The system of claim 24, wherein the count is not updated when the pre or post handler routine is invoked.

30. The system of claim 28, wherein the event is selected from the group consisting of cache misses and clock cycles.

31. A data processing system comprising:
an interrupt unit for receiving interrupt signals;
a pre handler routine and a post handler routine;
wherein responsive to receiving an interrupt signal for an interrupt at the interrupt unit, the pre handler routine logs a trace record at a first instant;
wherein responsive to completion of the interrupt, the post handler routine logs a trace record at a second instant; and
wherein the pre handler routine or the post handler routine monitors a count of recorded events to determine if an overflow occurred.

32. The system of claim 31, wherein the pre handler routine or the post handler routine handles the overflow by reading and resetting the count.

33. A computer program product in a computer readable medium, comprising:
first instructions for receiving an interrupt signal at an interrupt unit of a processor of the data processing system;
second instructions for determining if at least one of a pre handler routine and a post handler routine are enabled for an interrupt;
third instructions for invoking the pre handler routine to log a trace record at a first instant if the pre handler routine is enabled;
fourth instructions for invoking an interrupt handler routine following execution of the pre handler routine; and
fifth instructions for invoking the post handler routine following execution of the interrupt handler routine to log a trace record at a second instant if the post handler routine is enabled.

34. The computer program product of claim 33, wherein the trace record includes a from address of an instruction indicating where the interrupt occurs.

35. The computer program product of claim 33, wherein the trace record includes a plurality of counts.

36. The computer program product of claim 33, wherein the trace record includes a timestamp.

37. The computer program product of claim 33, further comprising a plurality of pre handler routines and a plurality of post handler routines, wherein each pre handler routine and each post handler routine logs a different event on the occurrence of an interrupt.

38. The computer program product of claim 33, wherein the first and second instants are associated with first and second timestamps in the trace record, respectively.

39. The computer program product of claim 35, wherein the count is not updated when the pre or post handler is invoked.

40. The computer program product of claim 35, wherein the count represents the number of times an event occurs.

41. The computer program product of claim 40, wherein the event is selected from the group consisting of cache misses and clock cycles.

42. A computer program product in a computer readable medium, comprising:
   first instructions for receiving an interrupt signal at an interrupt unit of a processor of the data processing system;
   second instructions for determining if at least one of a pre handler routine and a post handler routine are enabled for an interrupt;
   third instructions for invoking the pre handler routine to log a trace record at a first instant if the pre handler routine is enabled;
   fourth instructions for invoking an interrupt handler routine; and
   fifth instructions for invoking the post handler routine to log a trace record at a second instant if the post handler routine is enabled,
   wherein the pre handler routine or the post handler routine monitors a count of recorded events to determine if an overflow occurred.

43. The computer program product of claim 42, wherein the pre handler routine or the post handler routine handles the overflow by reading and resetting the count.

44. A method of executing branch instructions in a data processing system, comprising the steps of:
   executing a branch instruction of a program;
   receiving a signal at an interrupt unit of a processor of the data processing system in response to executing a trap, wherein the trap is executed in response to executing the branch instruction of the program;
   invoking a pre handler routine prior to execution of an interrupt routine to log a trace record at a first instant in response to receiving the signal;
   invoking a post handler routine after execution of the interrupt routine to log a trace record at a second instant when the execution of the branch instruction of a program is complete.

45. The method of claim 44, wherein the trace record includes a from address indicating an address of the branch instruction.

46. The method of claim 44, wherein the trace record includes a to address indicating an address of branch to instruction.

47. The method of claim 44, wherein the trace record includes a plurality of counts.

48. The method of claim 44, wherein the trace record includes a timestamp.

49. The method of claim 44, further comprising a plurality of pre handler routines and a plurality of post handler routines, wherein each pre handler routine and each post handler routine logs a different event.

50. The method of claim 44, wherein the first and second instants are associated with first and second timestamps in the trace record, respectively.

51. The method of claim 47, wherein the count represents the number of times an event occurs.

52. The method of claim 47, wherein the count is not updated when the pre and post handler routine is invoked.

53. The method of claim 51, wherein the event is selected from the group consisting of cache misses and clock cycles.

* * * * *